US008549120B2

(12) United States Patent  (10) Patent No.: US 8,549,120 B2
Bhat et al.  (45) Date of Patent: Oct. 1, 2013

(54) SYSTEM AND METHOD FOR LOCATION BASED ADDRESS ASSIGNMENT IN THE DISTRIBUTION OF TRAFFIC IN A VIRTUAL GATEWAY

(75) Inventors: Arvind Bhaskar Bhat, Bangalore (IN); Ramkumar Sankar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 12/824,372

(22) Filed: Jun. 28, 2010

(65) Prior Publication Data

US 2011/0320577 A1    Dec. 29, 2011

(51) Int. Cl.
*G06F 15/177*    (2006.01)
(52) U.S. Cl.
USPC ........... 709/222; 709/238; 709/239; 709/245; 709/220; 709/221; 370/219; 370/396; 370/351
(58) Field of Classification Search
USPC . 709/238–239, 245, 220–222; 370/219–220, 370/396–397, 351
See application file for complete search history.

(56) References Cited

U.S. PATENT DOCUMENTS

| | | | |
|---|---|---|---|
| 5,473,599 A * | 12/1995 | Li et al. ......................... | 370/219 |
| 6,397,260 B1 * | 5/2002 | Wils et al. ..................... | 709/238 |
| 7,881,208 B1 | 2/2011 | Nosella et al. | |
| 2003/0037165 A1 | 2/2003 | Shinomiya | |
| 2003/0133420 A1 | 7/2003 | Haddad | |
| 2004/0071141 A1 | 4/2004 | Dhara et al. | |
| 2005/0111352 A1 * | 5/2005 | Ho et al. ....................... | 370/219 |
| 2005/0198243 A1 * | 9/2005 | Snible et al. .................. | 709/223 |
| 2005/0213832 A1 | 9/2005 | Schofield et al. | |
| 2008/0316982 A1 * | 12/2008 | Murty et al. .................. | 370/338 |
| 2009/0031415 A1 * | 1/2009 | Aldridge et al. ............... | 726/15 |
| 2010/0077064 A1 * | 3/2010 | Viger et al. ................... | 709/221 |

* cited by examiner

*Primary Examiner* — Wing F Chan
*Assistant Examiner* — Benjamin M. Thieu
(74) *Attorney, Agent, or Firm* — Baker Botts L.L.P.

(57) ABSTRACT

A method for location based address assignment for the distribution of traffic is provided that includes receiving a request for service from a host. A location of the host within a network environment is identified. A selected one of a plurality of gateway devices is assigned to service the host based on the location of the host within the network environment and the location of the selected one of the gateway devices within the network environment. A forwarding address associated with the selected one of the gateway devices is transmitted to the host for subsequent use by the host in forwarding network traffic.

23 Claims, 3 Drawing Sheets

SYSTEM AND METHOD FOR LOCATION BASED ADDRESS ASSIGNMENT IN THE DISTRIBUTION OF TRAFFIC IN A VIRTUAL GATEWAY

TECHNICAL FIELD OF THE INVENTION

This invention relates in general to the field of network communications and, more particularly, to a system and method for location based address assignment in the distribution of traffic in a virtual gateway.

BACKGROUND OF THE INVENTION

Local area networks (LANs) are commonly connected to one another through one or more routers so that a host (a workstation such as a PC, data center server, or other arbitrary LAN entity) on one LAN can communicate with other hosts on a different LAN (that is, remote or external networks). Typically, a host is able to communicate directly only with the entities on its local LAN segment. When it needs to send a data packet to an address that it does not recognize as being local, it communicates through a router (or other layer-3 or gateway device) which determines how to direct the packet between the host and the destination address in a remote network. A data center environment, which may include many hosts spanning multiple geographical sites, is an example of one such environment.

Unfortunately, a router may, for a variety of reasons, become inoperative after a power failure, reboot, scheduled maintenance, or other event. Such potential router failure has led to the development and use of redundant systems. Accordingly, a data center interconnect may have more than one gateway device to provide a back up in the event of primary gateway device failure. When a gateway device fails in such a redundancy system, the host communicating through the inoperative gateway device may still remain connected to other LANs by sending packets to and through another gateway device connected to the host's LAN.

Various protocols and techniques have been devised to allow a host to choose a router from among a group of routers in a network. Certain of these protocols allow each host to be dynamically assigned to a gateway device such that multiple gateway devices in a redundancy group simultaneously handle traffic. Hosts may be assigned to a router by random or round robin assignment or according to load balancing techniques.

Often a non-local router is assigned to a host. As a result, network traffic from the host traverses the data center interconnect. Such traffic is highly inefficient as it contributes to additional bandwidth cost of the data center interconnect and higher traffic latencies. Additionally, where the gateway devices are virtual machines that may move locales within the data center environment, the relocation of a host may result in traffic traversing the data center.

Accordingly, the ability to provide a communications system that consumes few resources, optimizes bandwidth, and achieves superior performance in a data center environment presents a significant challenge for network operators, service providers, and system administrators.

SUMMARY OF THE INVENTION

In accordance with the teachings of the present disclosure, disadvantages and problems associated with previous address assignment solutions can be reduced or eliminated by providing a system and method for location based address assignment.

In accordance with one embodiment of the present invention, a method for location based address assignment for the distribution of traffic includes receiving a request for service from a host. A location of the host within a network environment is identified. A selected one of a plurality of gateway devices is assigned to service the host based on the location of the host within the network environment and the location of the selected one of the gateway devices within the network environment. A forwarding address associated with the selected one of the gateway devices is transmitted to the host for subsequent use by the host in forwarding network traffic.

In accordance with another embodiment of the present invention, a non-transitory computer readable medium including logic is provided. The logic is operable, when executed by a processor, to receive a request for service from a host. The logic is further operable to identify a location of the host within a network environment and assign a selected one of a plurality of gateway devices to service the host based on the location of the host within the network environment and the location of the selected one of the gateway devices within the network environment. The logic is further operable to transmit a forwarding address associated with the selected one of the gateway devices to the host for subsequent use by the host in forwarding network traffic.

In accordance with another embodiment of the present invention, an apparatus for location based address assignment for the distribution of traffic is provided. The apparatus includes a first data center location comprising a first plurality of local hosts and a second data center location comprising a second plurality of local hosts. The apparatus further includes a data center interconnect between the first network environment location and the second network environment location. The data center interconnect includes a plurality of gateway devices, and at least one of the gateway devices receives a request for service from a host located in the first data center location. The gateway device then identifies the presence of the host within the first data center location and assigns a selected one of a plurality of gateway devices to service the host based on the presence of the host within the first data center location and a presence of the selected one of the gateway devices on a side of the data center interconnect that is proximate to the first data center location. The gateway device then transmits a forwarding address associated with the selected one of the gateway devices to the host for subsequent use by the host in forwarding network traffic.

Certain embodiments of the present invention may provide a number of technical advantages. For example, according to one embodiment of the present invention, the location of a host may be considered when selecting a gateway device to service the host. Specifically, a gateway device that is local to a host may be selected to service the host. In one particular embodiment, for example, a gateway device on the same side of the data center interconnect may be selected to service a host. As a result, layer-3 traffic originating from a host need not unnecessarily traverse the DCI link to reach its layer-3 destination. Network traffic may be more efficiently handled, and bandwidth costs for the DCI may be reduced. Additionally or alternatively, network traffic may not substantially add to traffic latencies on data center interconnect links, thus, resulting in non-optimal traffic forwarding.

In another embodiment of the present invention, an advantage may be more seamless mobility of virtual machines that may move locales within the data center environment. The assignment and reassignment of vMAC addresses based on the current location of virtual machines may prevent network traffic from unnecessarily traversing the data center interconnect. Where layer-3 traffic from the virtual machines is prevented from traversing the DCI interfaces, inefficiencies resulting from the mobility of virtual machines may be reduced.

Certain embodiments of the present invention may enjoy some, all, or none of these advantages. Other technical advantages may be readily apparent to those skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
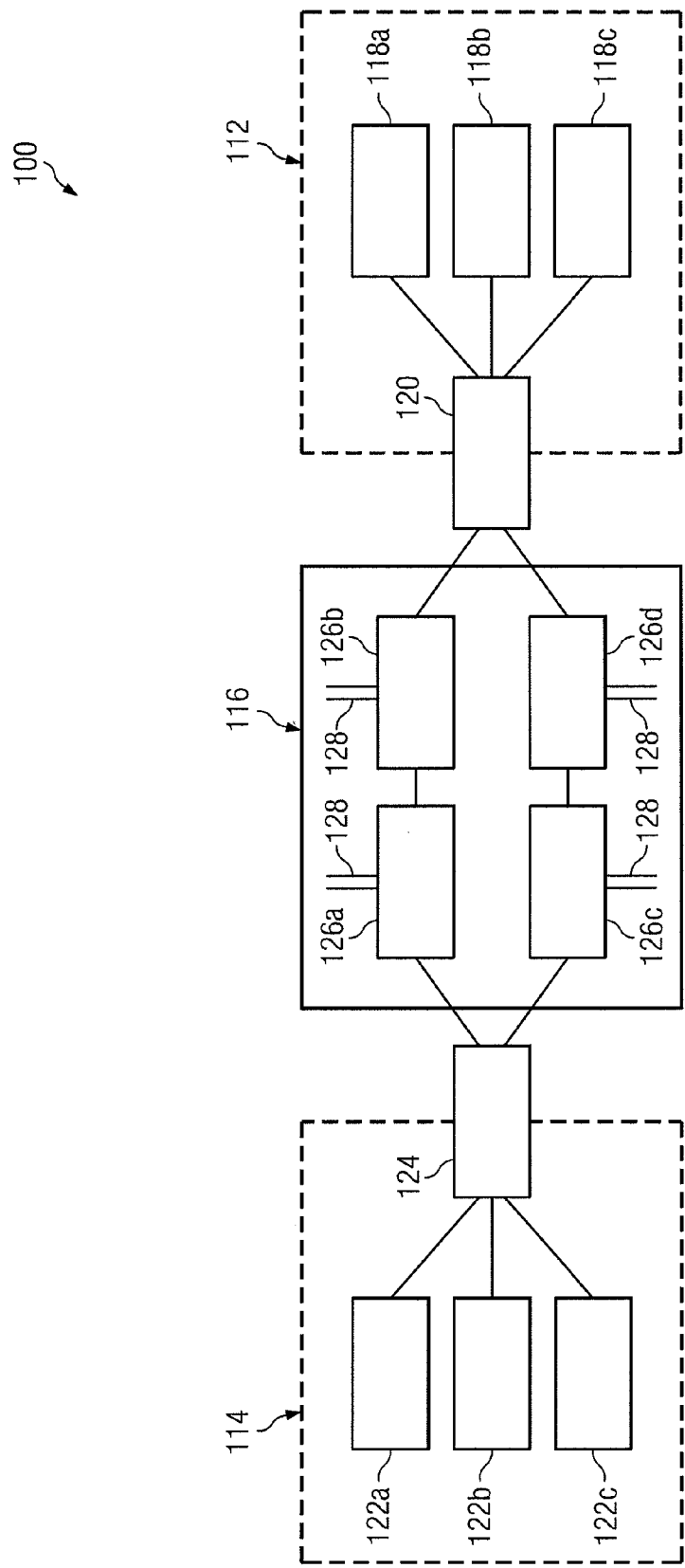
FIG. 1 is a simplified block diagram of a communication system enabling location based address assignment in the distribution of traffic in a virtual gateway.

FIG. 1 is a simplified block diagram of a communication system 100 enabling location based address assignment for the distribution of traffic in a virtual gateway in accordance with one embodiment of the present invention. As depicted, communication system 100 includes two local area networks (LANs) 112 and 114 connected to one another through a gateway redundancy group 116. LAN 112 includes one or more hosts 118 that may include a client, server, or other entity. Likewise LAN 114 includes one or more hosts 122 that may include a client, server, or other entity. Though FIG. 1 depicts LANs 112 and 114, other types of networks may be additionally or alternatively included in communication system 100.

Hosts 118 and 122 may represent any component suitable for communication. For example, hosts 118 and 122 include any collection of hardware, software, memory, and/or controlling software, instructions, or logic operable to communicate with other devices over communication LANS 112 and 114. For example, each of hosts 118 and 122 may represent any computing device such as a server, network component, personal computer, mobile device, storage device, or any other appropriate computing device. In a particular embodiment, one or more of hosts 118 and 122 may include a data center server.

Hosts 118 are able to communicate directly with other local hosts 118 within LAN 112 by way of a switch 120. Similarly, hosts 122 are able to communicate directly with other local hosts 122 within LAN 114 by way of a switch 124. However, when a host 118 on LAN 112 seeks to communicate with a host 122 on LAN 114, or vice versa, the host must communicate through a gateway device such as gateway redundancy group 116 (or other layer-2/3 switch). Redundancy group 116 determines how to direct the communication between host 118 and host 122. Although gateway redundancy group 116 functions as a single virtual gateway for hosts 118 and 122, gateway redundancy group 116 may include two or more gateway devices 126 in particular embodiments.

Gateway devices 126 may represent any components suitable for communication. For example, gateway devices 126 may include any collection of hardware, software, processors, microcontrollers, memory, and/or controlling software, programmable instructions, or logic operable to communicate with other devices over LANS 112 and 114 or another network. It is further contemplated that gateway devices 126 may represent any computing devices such as servers, network components, personal computers, mobile devices, storage devices, or any other appropriate computing devices. In a particular embodiment, one or more of gateway devices 126 may include a router.

While hosts 118 and 122 may communicate with each other over a layer-2 network, gateway redundancy group 116 provides for layer-3 network communication. Stated differently, in particular embodiments, gateway redundancy group 116 operates as a layer-3 router to allow hosts 118 and 122 to communicate with devices using layer-3 links 128. Thus, gateway redundancy group 116 provides IP connectivity to reach beyond the layer-2 network. In a particular embodiment, gateway redundancy group 116 includes a highly scalable layer-3 network environment such as a data center environment. Various protocols have been developed to provide network resiliency in a data center environment. Specifically, loop detection and loop management mechanisms have been developed to limit the effect of a topology loop in the network. Such mechanisms break loops in the network such that only one active path is allowed from device to another regardless of how many actual connections might exist.

One such protocol for addressing the effects of a topology loop include virtual PortChannel (vPC) technology as standardized in IEEE 802.3ad. vPC technology enables all links between participating devices to forward traffic while managing the loop problem by bundling the links as one logical link. In a particular embodiment, gateway redundancy group 116 includes two or more vPC pairs. For example, gateway devices 126a and 126c may include distribution/core switches that form a first vPC pair and are connected to switch 124 through a first port-channel interface. Similarly, gateway devices 126b and 126d may include distribution/core switches that form a second vPC pair and are connected to switch 120 through a second port-channel interface. In such an embodiment, gateway devices 126a and 126c maintain a vPC connection with switch 124 on the access side while maintaining a vPC connection with gateway devices 126b and 126d on the data center interconnect (hereinafter "DCI") side. Likewise, gateway devices 126b and 126d maintain a vPC connection with switch 120 on the access side while maintaining a vPC connection with gateway devices 126a and 126c on the DCI side. Thus, as depicted there are a total of four vPC connections in gateway redundancy group 116. Each vPC pair appears to their respective switches 120 and 124 like a single logical entity though they operate as two separate devices.

Additional mechanisms and protocols have been devised for selecting a particular gateway device 126 to service a host and to provide protection against equipment failure. One such protocol includes gateway load balancing protocol (GLBP) as developed by Cisco and as disclosed in U.S. Ser. No. 09/883,674 filed Jun. 18, 2001, entitled GATEWAY LOAD BALANCING PROTOCOL, which is incorporated herein by reference in its entirety for all purposes. According to GLBP, when a host 118 or 122 seeks to communicate with a device via the layer-3 links 128, a gateway device 126 is selected from among the group of gateway devices 126 in gateway redundancy group 116 to service the host 118.

In a particular embodiment, system 100 is a GLBP gateway system. Accordingly, a single virtual IP address is shared by gateway devices 126. Each gateway device 126 then maintains an actual IP address (also referred to as an "aIP address") that is unique to the particular gateway device 126. Additionally, each gateway device 126 has its own BIA Media Access Control address (also referred to herein as an "aMAC address") and a single virtual MAC address (also referred to herein as an "vMAC address"). In a particular embodiment, vMAC addresses are assigned to gateway devices 126 in response to hello messages that are received from the gateway devices. Use of vMAC addresses allows interchange-ability of gateway devices 126 without the need for reprogramming of the system in case of failure of any one of gateway devices 126. The gateway bit set for an active vMAC is set to forward layer-3 traffic.

According to GLBP, system 100 may have a "master" gateway device (also referred to herein as an "Active Virtual Gateway" or AVG device) in the redundancy group 116 that controls address assignment and failover features. For example, in the depicted example, gateway device 126a may be designated as the AVG. AVG 126a receives hello messages from gateway devices 126 that are currently operational. Additionally, AVG 126a is responsible for allocating an active virtual Media Access Control (vMAC) address to each of gateway devices in gateway redundancy group 116.

When seeking to send communications outside of their local LAN 112 or LAN 114, respectively, hosts 118 and 122 utilize gateway redundancy group 116 and AVG 126a, specifically, to perform address resolution for hosts 118 and 122. Gateway devices not functioning as a master device or AVG may be referred to as "standby" and/or "slave" gateway devices, in accordance with standard GLBP nomenclature and operation). Any gateway device that is forwarding packets is referred to herein as an "Active Virtual Forwarder" or AVF device. Thus, each redundancy group has one AVG device and one or more AVF devices.

When a host 118 seeks to communicate a packet or other data to a device via a layer-3 link 128, host 118 may perform IP-ARP resolution to learn the data-link vMAC address of the gateway 126 assigned to service the particular host 118. For example, a host 118 may send an ARP inquiry to the IP address of the gateway redundancy group 116. The AVG 126a may respond to the host's ARP request by selecting a particular one of the gateway devices 126 to service the host and then notifying the host 118 of the vMAC address of the selected gateway device 126. AVG 126a instructs the ARPing host 118 to address outgoing communications to the vMAC address assigned to the selected gateway device 126. Host 118 then uses the vMAC address of the selected gateway device 126 to forward network traffic to gateway redundancy group 116 via a data-link layer transfer.

In a typical GLBP system, a gateway device 126 is selected to service a host 118 or 122 by random assignment, round robin assignment, or by using another prescribed algorithm or methodology. Though the name GLBP includes the phrase "load balancing", there is no "balancing" of the traffic loads, per se, across the gateway using the GLBP protocol alone since the load of the gateway devices is not taken into consideration during the assignment of a gateway device to service a host. A refinement to GLBP is disclosed in U.S. Ser. No. 10/632,704 filed Jul. 31, 2003, entitled DISTRIBUTING AND BALANCING TRAFFIC FLOW IN A VIRTUAL GATEWAY, which is incorporated herein by reference in its entirety for all purposes. The refinement takes into consideration the load of the gateway devices when selecting a gateway to service a particular host. Thus, the refinement allows for actual balancing of the load among gateway devices.

When utilizing GLBP protocol or a load balancing protocol, the gateway device 126 selected to service a host 118 or 122 may not be a gateway device that is proximate to the ARPing host. For example, when AVG 126a receives an ARP request from a host 118, AVG 126a may consider the load of each gateway but not the location of the gateway 126 to host 118. As such, AVG 126a may select gateway 126c to service host 118 even when a gateway, such as gateway 126b or 126d, may be on the same side of the DC interconnect as host 118 and equally able to service host 118. As a result, layer-3 traffic originating from hosts 118 on LAN 112 must traverse the DCI link to reach layer-3 links 128 and its ultimate layer-3 destinations. Similarly, if hosts 122 are provided a vMAC address that is active in either of gateway devices 126b and 126d, the layer-3 traffic from hosts 122 must traverse the DCI interfaces. Network traffic that unnecessarily travels the DCI links is highly inefficient and contributes to additional bandwidth cost for the DCI. Additionally, network traffic on the DCI links adds to higher traffic latencies and results in non-optimal traffic forwarding.

In a particular embodiment, the location of a host 118 or 122 may be considered when selecting a gateway device 126 to service the host. Specifically, AVG 126a may operate to ensure that local layer-3 traffic does not cross the DCI link by considering the locality of host 118 or 122 and the locality of operational gateway devices 126 before assigning a vMAC. When AVG 126a receives an ARP request from a host 118 or 122, AVG 126a may consider the location of the particular host 118 or 122 and select a gateway 126 that is on the same side of the DCI as the host.

For example, a switch virtual interface (SVI) may provide layer-3 interconnectivity between hosts 118 and switch 120. Likewise, a SVI may provide multiple layer-2 ports between hosts 122 and switch 124. Each SVI may have multiple layer-2 ports. In a particular embodiment, when AVG 126a receives an ARP request from a host 118, AVG 126a may identify the layer-2 port from where the ARP request is received. Thus, when an ARP request is received from host 118, AVG 126a may determine the layer-2 port from which the ARP request is received. AVG 126a may then determine if a GLBP hello message has been received from a gateway device 126 on the same port. If AVG 126a determines that a GLBP hello message has been received on the same layer-2 port from either of gateway devices 126b and 126d, AVG 126a may identify that gateway device 126b or 126d as being the most appropriate gateway for servicing host 118. More specifically, a hello message from either of gateway devices 126b or 126d indicates to AVG 126a that the particular gateway 126b or 126d is on the same side of the DCI as the ARPing host 118. For more efficient network traffic routing, AVG 126a may then select the vMAC associated with the gateway devices 126b or 126d that was associated with the hello message received at the same layer-2 port that received the ARP request.

In some instances, there may be no active vMAC associated with the layer-2 port from where the ARP request was received. For example, in a particular embodiment, AVG 126a may receive an ARP request from a host 122 and identify the layer-2 port from where the ARP request is received. As described above, assume that AVG 126a determines that one or more hello messages were received from gateway devices 126b or 126d. However, gateway devices 126b and 126d are not on the same side of the interconnect as the layer-2 port from where the ARP request from host 122 was received. As such, AVG 126a identifies the gateway devices 126 that are on the same side of the interconnect as the layer-2 port from where the ARP request was received. In the depicted and above-described example, AVG 126a may identify gateway devices 126a and 126c as being on the same side of the interconnect as the layer-2 port from where the ARP request from host 122 was received. AVG 126a then identifies if any of the identified gateway devices have the GW bit set to forward layer-3 network traffic. Continuing the example depicted in FIG. 1, AVG 126a determines if either of gateway devices 126a or 126c have the GW bit set to forward network traffic. AVG 126a may then select the particular gateway device 126a or 126c having the GW bit set to forward network traffic.

In the extreme case where AVG 126a determines that there is no active vMAC associated with the layer-2 port from where the ARP request was received and that there is no vMAC having the GW bit set to forward layer-3 network traffic on the same side of the interconnect as the layer-2 port, gateway 126a may reply with any active vMAC.

In particular embodiments, an ARP reply timeout may be applied for the accurate assignment of an active vMAC address. For example, AVG 126a may wait a predetermined amount of time after receiving an ARP request before it responds to the ARP request with an active vMAC address. Specifically, to assure that software synchronization of MAC happens across the vPC peer, an ARP reply timeout may be implemented by AVG 126a. The amount of time corresponding to the ARP reply timeout should be greater than the vPC MAC sync timeout. Accordingly, in a particular embodiment, if AVG 126a receives an ARP request on a vPC peer link (i.e., the link between gateway device 126a and gateway 126b or 126d) and a MAC sync has not yet taken place, AVG 126a may wait an amount of time corresponding with the ARP reply timeout. After the expiration of the ARP reply timeout, AVG 126a may then select an active vMAC address to service the ARPing host. In this manner, AVG 126a may operate to accurately assign only active vMAC addresses that are currently set to forward.

Figure 2:
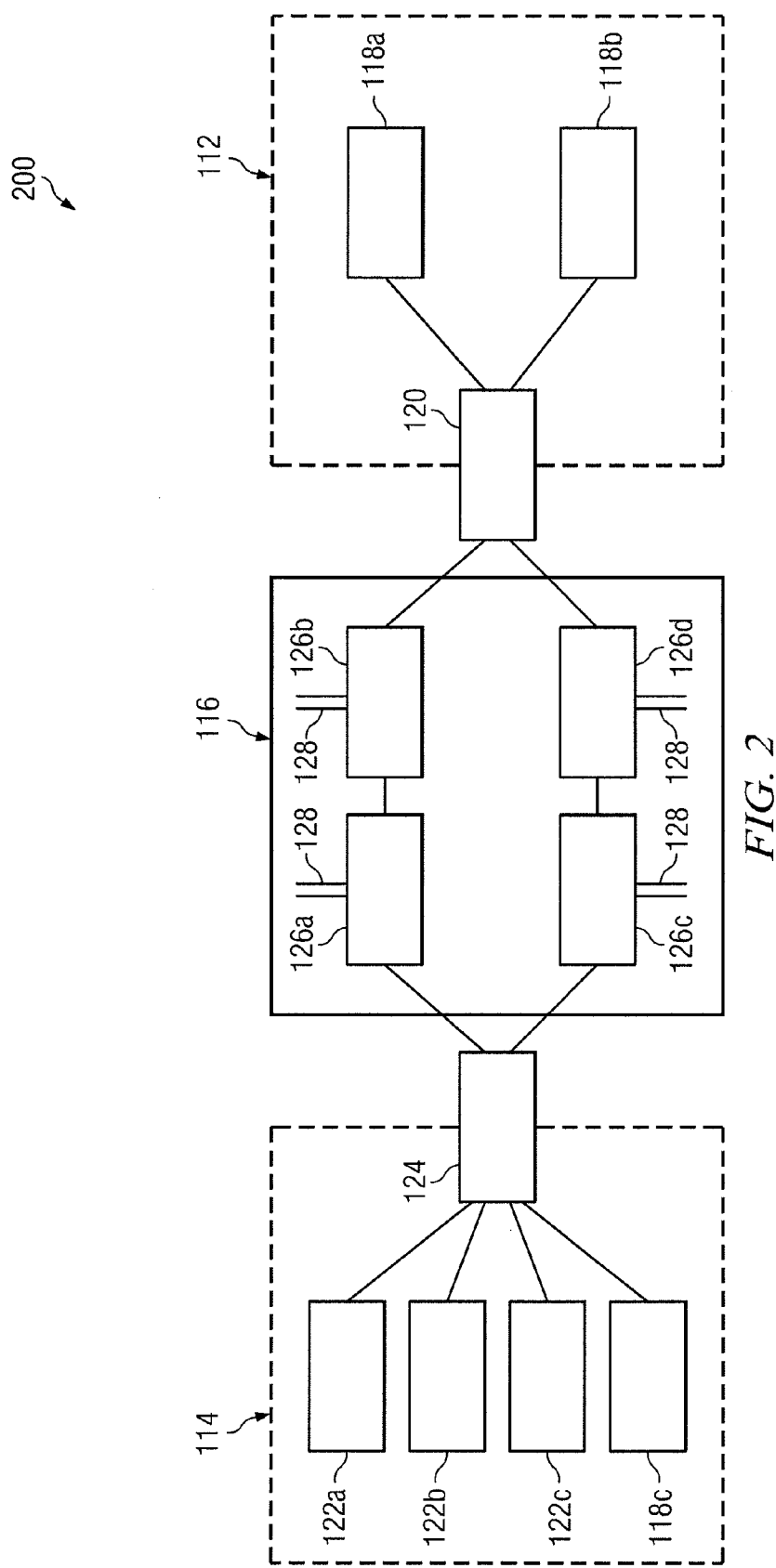
FIG. 2 is a simplified block diagram of a communication system enabling location based address assignment among virtual machines.

A key benefit provided by a layer-2 data center interconnect environment is seamless mobility of virtual machines within the layer-2 network. In a particular embodiment, the above described techniques may be used to improve vMAC address assignment to hosts 118 and/or 122 comprising virtual machines. FIG. 2 illustrates a simplified block diagram of a communication system 200 enabling location based address assignment to virtual machines.

Certain components of system 200 are similar to components of system 100 described above. Accordingly, like reference numerals refer to like parts. However, in the specific embodiment illustrated in FIG. 2, hosts 118 and/or hosts 122 include are virtual machines. Each host 118 and 122 may represent a separate instance of, for example, a host server using an operating system running in an isolated manner. Hosts 118 and 122 that are virtual machines allow a single computer to run multiple or different operating systems simultaneously.

Like communication system 100, communication system 200 includes the two local area networks (LANs) 112 and 114 connected to one another through gateway redundancy group 116. However, communication system 200 illustrates the configuration of network components after host 118c has moved from LAN 112 to LAN 114.

Assume that the methodology described above with regard to FIG. 1 was used in the initial assignment of an active vMAC address to host 118c when host 118c is located on LAN 112. As such, assume that host 118c receives an active vMAC address for gateway device 126b or 126d when on LAN 112. When host 118c relocates to LAN 114, however, host 118c may continue to send traffic towards the active vMAC address associated with gateway device 126b or 126d. As such, the relocation of host 118c to LAN 114 may result in layer-3 traffic from host 118c traversing the DCI link.

In accordance with a particular embodiment of the present invention, upon relocating to LAN 114, host 118c may transmit an ARP request to gateway redundancy group 116 to obtain a new virtual MAC address. When AVG 126a receives an ARP request from a host 118c, AVG 126a considers the location of host 118c on LAN 114 and selects a gateway 126a or 126c that is on the same side of the DCI as the host 118c.

More specifically, and as described above, AVG 126a may determine the layer-2 port from which the ARP request is received from host 118c. AVG 126a may then determine if a GLBP hello message has been received from a gateway device 126 on the same layer-2 port. If AVG 126a determines that a GLBP hello message has been received from gateway device 126c or if AVG 126a determines that it is assigned an active vMAC address, AVG 126a may select a vMAC among the set of active vMACs that are associated with gateway devices 126a and/or 126c.

If there is no active vMAC associated with the layer-2 port from where the ARP request was received, AVG 126a identifies the gateway devices 126 that are on the same side of the interconnect as the layer-2 port from where the ARP request from 118c was received. In the depicted example, As described above, assume that AVG 126a determines that one or more hello messages were received from gateway devices 126b or 126d. However, gateway devices 126b and 126d are not on the same side of the interconnect as the layer-2 port from where the ARP request from host 118c was received. As such, AVG 126a may identify gateway devices 126a and 126c as being on the same side of the interconnect as the layer-2 port from where the ARP request from host 118c was received. AVG 126a then identifies if either of the identified gateway devices have the GW bit set to forward network traffic. More specifically, and continuing the example described above, AVG 126a may determine if either of gateway devices 126a or 126c have the GW bit set to forward layer-3 network traffic. AVG 126a may then select the particular gateway device 126a or 126c having the GW bit set to forward layer-3 network traffic.

In the extreme case where AVG 126a determines that there is no active vMAC associated with the layer-2 port from where the ARP request was received and that there is no vMAC having the GW bit set to forward network traffic on the same side of the interconnect as the layer-2 port, gateway 126a may reply with any active vMAC.

Because AVG 126a is able to consider the location of a virtual machine when assigning an active vMAC address to the virtual machine, AVG 126a enables more optimal traffic forwarding. Specifically, AVG 126a is able to provide more seamless mobility of virtual machines within the network. Because layer-3 traffic from the virtual machines is prevented from traversing the DCI interfaces, AVG 126a reduces virtual machine mobility inefficiencies. Additionally, bandwidth costs for the DCI may be reduced, and traffic latencies may be improved.

Figure 3:
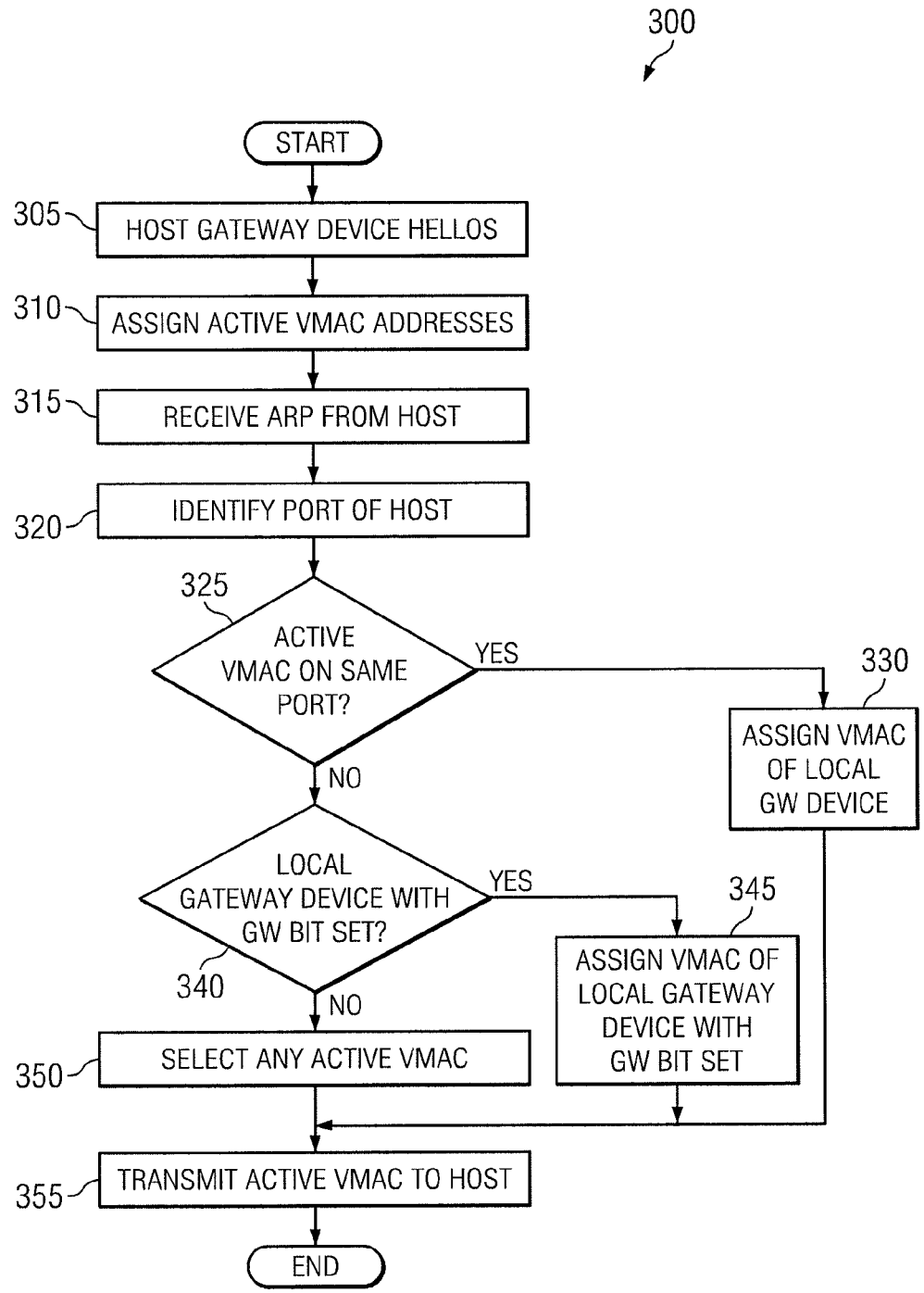
FIG. 3 is a simplified flowchart illustrating an example flow for providing location based address assignment in the distribution of traffic in a virtual gateway.

FIG. 3 illustrates a method 300 for providing location based address assignment in the distribution and balancing of traffic in a virtual gateway, in accordance with particular embodiments. In the embodiment depicted in FIG. 3 it may be assumed that the following steps are being performed by a computer system, such as communication system 100 or 200 described above with respect to FIGS. 1 and 2.

The method begins at step 305 with the hosting of gateway device 126 hello messages. In a particular embodiment, a selected one of the gateway devices 126 in gateway redundancy group 116 is designated the AVG 126a. AVG 126a receives hello messages from gateway devices 126. The hello messages may be directed to a multicast IP address shared by all gateway devices 126. In response to the hello messages, AVG 126a assigns an active vMAC address to each of gateway devices 126 in gateway redundancy group 116 at step 310.

At step 315, AVG 126a receives an ARP request from a host 118 or 122. For example, AVG 126a may receive an ARP request from host 118a when host 118a seeks to communicate a packet or other data to a device via layer-3 links 128. The IP-ARP resolution is initiated by host 118a to learn the data-link vMAC address of a particular gateway 126 assigned to service particular host 118a. In another example, and as described above with regard to FIG. 2, AVG 126a may receive an ARP request from host 118c when host 118c is relocated from one data center site to another. Specifically, AVG 126a may receive an ARP request from host 118c when host 118c is relocated from LAN 112 to LAN 114.

At step 320, AVG 126a identifies the location of the ARPing host 118 or 122. For example, and in a particular embodiment, when AVG 126a receives an ARP request from a host 118a, AVG 126a may identify the layer-2 port from where the ARP request is received.

At step 325, AVG 126a may determine if there is an active vMAC assigned on the same layer-2 port receiving the ARP from the host 118 or 122. For example, AVG 126a may determine if a GLBP hello message has been received from a gateway device 126 on the same layer-2 port that received the ARP request from host 118 or 122. In the depicted example communication system of FIG. 1, for example, AVG 126a may determine that a GLBP hello message has been received from either of gateway devices 126b and 126d via the same layer-2 port as the ARP request from host 118a. In response to this determination, AVG 126a assigns the active vMAC of either of gateway devices 126b or 126d to host traffic from host 118a at step 330. The active vMAC address is transmitted to the ARPing host 118 at step 335. Thereafter, when the host 118 desires to send packets to addresses over layer-3 links 128, host 118 will address outgoing communications to the virtual MAC address assigned to the selected gateway device 126b or 126d.

If at step 325, however, AVG 126a is unable to identify an active vMAC assigned on the same layer-2 port receiving the ARP from the host 118 or 122, the method continues to step 340. At step 340, a determination is made as to whether any local gateway device on the same side of the interconnect as the layer-2 port from where the ARP request was received has its GW bit set to forward. In the depicted example communication system of FIG. 1, for example, AVG 126a may determine that either of gateway devices 126a or 126c have the GW bit set to forward. In response to this determination, AVG 126a assigns the active vMAC of either of gateway devices 126a or 126c to host traffic from host 122a at step 345. The active vMAC address is transmitted to the ARPing ARPing host 122 at step 335. Thereafter, when the host 122 desires to send packets over layer-3 links 128, host 122 will address outgoing communications to the virtual MAC address assigned to the selected gateway device 126a or 126c.

If at step 340, however, AVG 126a is unable to identify a local gateway device with a GW bit set to forward, the method continues to step 350 where any active vMAC address is selected. In the above described example, steps 340 and 350 may be performed when, as described above, the ARP request is received from host 122 and AVG 126a determines that AVG 126a and 126c do not have the GW bit set to forward layer-3 traffic. As such, gateways 126b and 126d may be assigned the active vMACs. Accordingly, in the above described example, AVG 126a may select either of gateways 126b and 126d having the active vMACs to service host 122. Thereafter, when the host 122 desires to send packets over layer-3 links 128, host 122 will address outgoing communications to the virtual MAC address assigned to the selected gateway devices 126b or 126d. In this scenario, traffic from host 122 that is addressed to layer-3 destinations, must traverse the DCI.

Where the host 118 or 122 is assigned a vMAC address in either of steps 330 or 345, the location of the requesting host and the location of the active gateways are factors in the selection of a gateway device 126 to service the host 118 or 122. Accordingly, in these instances, AVG 126a operates to ensure that local layer-3 traffic does not cross the DCI link by considering the locality of host 118 or 122 before assigning a vMAC. In contrast, where AVG 126a is not able to identify a local gateway device with an active VMAC associated with the common layer-2 port or a local gateway devices with the GW bit set to forward on the same side of the interconnect as the layer-2 port in either of steps 325 and 340, the location of the ARPing host may not be considered a factor in the selection of the gateway device 126 to service the ARPing host. In the instance where any active vMAC address is assigned at step 350, AVG 126a does not operate to ensure that local layer-3 traffic does not cross the DCI link. However, the vMAC assignment does operate to prevent black-holing.

Some of the steps illustrated in FIG. 3 may be combined, modified or deleted where appropriate, and additional steps may also be added to the flowchart. Additionally, steps may be performed in any suitable order without departing from the scope of particular embodiments.

Certain embodiments of the present invention may provide a number of technical advantages. For example, according to one embodiment of the present invention, the location of a host may be considered when selecting a gateway device to service the host. Specifically, a gateway device that is local to a host may be selected to service the host. In one particular embodiment, for example, a gateway device on the same side of the data center interconnect may be selected to service a host. As a result, layer-3 traffic originating from a host need not unnecessarily traverse the DCI link to reach its layer-3 destination. Network traffic may be more efficiently handled, and bandwidth costs for the DCI may be reduced. Additionally or alternatively, network traffic may not substantially add to traffic latencies on data center interconnect links, thus, resulting in non-optimal traffic forwarding.

In another embodiment of the present invention, an advantage may be more seamless mobility of virtual machines that may move locales within the data center environment. The assignment and reassignment of vMAC addresses based on the current location of virtual machines may prevent network traffic from unnecessarily traversing the data center interconnect. Where layer-3 traffic from the virtual machines is prevented from traversing the DCI interfaces, inefficiencies resulting from the mobility of virtual machines may be reduced.

Other technical advantages will be readily apparent to one of ordinary skill in the art from the figures, descriptions, and claims provided herein. Moreover, while specific advantages have been enumerated above, various embodiments may include all, some, or none of the enumerated advantages.

Although particular embodiments have been described in detail, it should be understood that various other changes, substitutions, combinations and alterations may be made hereto without departing from the spirit and scope of the disclosure. For example, although an embodiment has been described with reference to a number of elements included within communication systems 100 and 200 such as devices and processors, these elements may be combined, rearranged or positioned in order to accommodate particular computing needs. In addition, any of these elements may be provided as separate external components to communication systems 100/200 or each other where appropriate.

As more specific examples, communication systems 100 and 200 are illustrated with a specific number of hosts 118 and 122. However, it is recognized that systems 100 and 200 may include any number of hosts 118 and 122 on either side of the gateway redundancy group 116. Furthermore, in a data center interconnect environment, it is contemplated that communication systems 100 and/or 200 may include additional data center location sites. The methods and techniques described herein are extensible to support a larger number of sites with hundreds or thousands of hosts and/or virtual machines. Furthermore, any of hosts 118 and 122 may comprise virtual machines capable of mobility from one data center site to another Particular embodiments contemplate great flexibility in the arrangement of these elements as well as their internal components.

Logic encoded in media may comprise software, hardware, instructions, code, logic, and/or programming encoded and/or embedded in one or more non-transitory and/or tangible computer-readable media, such as volatile and non-volatile memory modules, integrated circuits, hard disks, optical drives, flash drives, CD-Rs, CD-RWs, DVDs, ASICs, and/or programmable logic controllers.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method for location based address assignment for the distribution of traffic, comprises:
   receiving a request for service from a host;
   identifying a location of the host with respect to a data center interconnect within a network environment, the location of the host determined based on a port from where the request from the host is received;
   assigning a selected one of a plurality of gateway devices to service the host based on:
      the location of the host within the network environment; and
      the location of the selected one of the gateway devices within the network environment, the selected one of the gateway devices determined to be located on a same side of the data center interconnect as the port from where the request from the host is received; and
   transmitting a forwarding address associated with the selected one of the gateway devices to the host for subsequent use by the host in forwarding network traffic.

2. The method of claim 1, wherein the request for service from the host comprises an ARP request.

3. The method of claim 1, wherein the plurality of gateway devices comprise a gateway redundancy group forming a data center interconnect between a plurality of data center locations.

4. The method of claim 3, wherein the host comprises a data center server.

5. The method of claim 3, wherein:
   the host comprises a virtual machine; and
   the request for service is transmitted from the virtual machine in response to a relocation of the virtual machine from a first data center location to a second data center location.

6. The method of claim 1, wherein identifying the location of the host within the network environment comprises identifying a layer-2 port from where the request from the host is received.

7. The method of claim 6, wherein assigning the selected one of a plurality of gateway devices to service the host comprises:
   identifying that a hello message has been received at the layer-2 port from the selected one of the plurality of gateway devices.

8. The method of claim 1, wherein the forwarding address comprises a vMAC address assigned to the selected one of the plurality of gateway devices.

9. The method of claim 1, wherein assigning the selected one of the plurality of gateway devices to service the host based on: the location of the host within the network environment; and the location of the selected one of the gateway devices within the network environment comprises:
   assigning the selected one of the plurality of gateway devices that is more physically proximate to the host to service the host.

10. A method for location based address assignment for the distribution of traffic, comprises:
   receiving a request for service from a host;
   identifying a location of the host within a network environment;
   assigning a selected one of a plurality of gateway devices to service the host based on:
      the location of the host within the network environment; and
      the location of the selected one of the gateway devices within the network environment; and
   transmitting a forwarding address associated with the selected one of the gateway devices to the host for subsequent use by the host in forwarding network traffic, and
   wherein assigning the selected one of a plurality of gateway devices to service the host comprises identifying that a hello message has been received at the layer-2 port from the selected one of the plurality of gateway devices, and
   wherein assigning the selected one of a plurality of gateway devices to service the host comprises:
      identifying that the selected one of the plurality of gateway devices is on the same side of a data center interconnect as the layer-2 port from where the request from the host is received; and
      identifying that the selected one of the plurality of gateway devices has a GW bit set to forward traffic.

11. A non-transitory computer readable medium comprising logic, the logic, when executed by a processor, operable to
   receive a request for service from a host;
   identify a location of the host with respect to a data center interconnect within a network environment, the location of the host determined based on a port from where the request from the host is received;
   assign a selected one of a plurality of gateway devices to service the host based on:
      the location of the host within the network environment; and
      the location of the selected one of the gateway devices within the network environment, the selected one of the gateway devices determined to be located on a same side of the data center interconnect as the port from where the request from the host is received; and
transmit a forwarding address associated with the selected one of the gateway devices to the host for subsequent use by the host in forwarding network traffic.

12. The medium of claim 11, wherein the request for service from the host comprises an ARP request.

13. The medium of claim 11, wherein the plurality of gateway devices comprise a gateway redundancy group forming a data center interconnect between a plurality of data center locations.

14. The medium of claim 13, wherein the host comprises a data center server.

15. The medium of claim 13, wherein:
the host comprises a virtual machine; and
the request for service is transmitted from the virtual machine in response to a relocation of the virtual machine from a first data center location to a second data center location.

16. The medium of claim 13, wherein identifying the location of the host within the network environment comprises identifying a layer-2 port from where the request from the host is received.

17. The medium of claim 16, wherein assigning the selected one of a plurality of gateway devices to service the host comprises:
identifying that a hello message has been received at the layer-2 port from the selected one of the plurality of gateway devices.

18. The medium of claim 16, wherein assigning the selected one of a plurality of gateway devices to service the host comprises:
identifying that the selected one of the plurality of gateway devices is on the same side of the data center interconnect as the layer-2 port from where the request from the host is received; and
identifying that the selected one of the plurality of gateway devices has a GW bit set to forward traffic.

19. The medium of claim 11, wherein the forwarding address comprises a vMAC address assigned to the selected one of the plurality of gateway devices.

20. The medium of claim 11, wherein assigning the selected one of the plurality of gateway devices to service the host based on: the location of the host within the network environment; and the location of the selected one of the gateway devices within the network environment comprises:
assigning the selected one of the plurality of gateway devices that is more physically proximate to the host to service the host.

21. An apparatus for location based address assignment for the distribution of traffic, comprising:
a first data center location comprising a first plurality of local hosts;
a second data center location comprising a second plurality of local hosts;
a data center interconnect coupling the first network environment location and the second network environment location, the data center interconnect comprising a plurality of gateway devices;
wherein at least one of the gateway devices is operable to:
receive a request for service from a host located in the first data center location;
identify the presence of the host within the first data center location based on a port from where the request from the host is received;
assign a selected one of a plurality of gateway devices to service the host based on:
the presence of the host within the first data center location; and
a presence of the selected one of the gateway devices on a same side of the data center interconnect as the port from where the request from the host is received; and
transmit a forwarding address associated with the selected one of the gateway devices to the host for subsequent use by the host in forwarding network traffic.

22. The apparatus of claim 21, wherein:
the request for service from the host comprises an ARP request from a virtual machine that is received in response to a relocation of the virtual machine from the second data center location to the first data center location;
the forwarding address comprises a vMAC address assigned to the selected one of the plurality of gateway devices;
the at least one computing device is operable to identify the presence of the host within the first data center location by identifying a layer-2 port from where the request from the host is received; and
the at least one computing device is operable to assign the selected one of a plurality of gateway devices by at least one of:
determining that a hello message has been received at the layer-2 port from the selected one of the plurality of gateway devices; and
determining that the selected one of the plurality of gateway devices has a GW bit set to forward traffic.

23. The apparatus of claim 21, wherein the at least one of the gateway devices is operable to assign the selected one of the plurality of gateway devices to service the host based on: the location of the host within the network environment; and the location of the selected one of the gateway devices within the network environment by:
assigning the selected one of the plurality of gateway devices that is more physically proximate to the host to service the host.

* * * * *